US012591291B2

(12) United States Patent
Kurisu et al.

(10) Patent No.: US 12,591,291 B2
(45) Date of Patent: Mar. 31, 2026

(54) INFORMATION PROCESSING DEVICE HAVING SUB-PROCESSOR FOR DATA EVACUATION PROCESS

(71) Applicant: TOYOTA JIDOSHA KABUSHIKI KAISHA, Toyota (JP)

(72) Inventors: Satofumi Kurisu, Nagoya (JP); Kosuke Ohashi, Kiyosu (JP); Ryo Anan, Toyota (JP); Ryota Nakabayashi, Nagoya (JP); Nobutaka Suzuki, Toyota (JP); Kiyoto Suzuki, Tokoname (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/641,612

(22) Filed: Apr. 22, 2024

(65) Prior Publication Data

US 2025/0060805 A1 Feb. 20, 2025

(30) Foreign Application Priority Data

Aug. 14, 2023 (JP) ................................. 2023-131923

(51) Int. Cl.
 *G06F 1/00* (2006.01)
 *G06F 1/3234* (2019.01)
(52) U.S. Cl.
 CPC .................................. *G06F 1/3234* (2013.01)

(58) Field of Classification Search
 CPC ............................. G06F 1/3234; G06F 1/3275
 See application file for complete search history.

(56) References Cited

U.S. PATENT DOCUMENTS

| | | | | |
|---|---|---|---|---|
| 11,966,341 B1 * | 4/2024 | Boenapalli | ............ | G06F 1/3275 |
| 2013/0159599 A1 * | 6/2013 | Bar-Or | .................. | G06F 9/4418 |
| | | | | 711/E12.008 |
| 2013/0173942 A1 * | 7/2013 | Forristal | ................... | G06F 1/32 |
| | | | | 713/323 |
| 2017/0344302 A1 * | 11/2017 | Blicharski | ............ | G06F 3/0625 |
| 2022/0300172 A1 | 9/2022 | Kurita et al. | | |

FOREIGN PATENT DOCUMENTS

| | | | | |
|---|---|---|---|---|
| CN | 104598406 A | 5/2015 | | |
| JP | 2002-229864 A | 8/2002 | | |
| JP | 2011-158967 A | 8/2011 | | |
| JP | 2022-146519 A | 10/2022 | | |
| TW | 201624475 A * | 7/2016 | ............... | G11C 5/14 |
| WO | WO-2016123844 A1 * | 8/2016 | ............ | H04M 1/725 |

* cited by examiner

*Primary Examiner* — Xuxing Chen

(74) *Attorney, Agent, or Firm* — SoraIP, Inc.

(57) ABSTRACT

The information processing device includes a CPU, DRAM, SRAM and hibernation circuitry. The hibernation circuit executes an evacuation processing of reading out particular data which is data stored in DRAM and storing the particular data in SRAM when a predetermined execution condition for hibernation is satisfied. CPU shuts off the electric power supply to DRAM while maintaining the electric power supply to SRAM after the evacuation processing is completed. When startup, CPU reads out the particular data stored in SRAM when the particular data is stored in SRAM.

8 Claims, 3 Drawing Sheets

INFORMATION PROCESSING DEVICE HAVING SUB-PROCESSOR FOR DATA EVACUATION PROCESS

CROSS-REFERENCE TO RELATED APPLICATION

This application claims priority to Japanese Patent Application No. 2023-131923 filed on Aug. 14, 2023, incorporated herein by reference in its entirety.

BACKGROUND

1. Technical Field

The disclosure relates to an information processing device.

2. Description of Related Art

An information processing system described in Japanese Unexamined Patent Application Publication No. 2022-146519 (JP 2022-146519 A) includes a processor, random-access memory (RAM), and NOT-AND (NAND) memory. The processor is capable of executing various types of processing by executing a program. The RAM is volatile memory. The NAND memory is non-volatile memory.

The information processing system according to JP 2022-146519 A executes hibernation. Specifically, when a power source of the information processing system is transitioned to an off state, the information processing system stores data in the RAM, which is volatile memory, in NAND memory, which is non-volatile memory, and thereafter transitions the power source to the off state. When the power source of the information processing system is transitioned to an on state, the information processing system restores the data that is stored, from the NAND memory, which is non-volatile memory, to the RAM, which is volatile memory.

SUMMARY

In the information processing system according to JP 2022-146519 A, electric power is also consumed for the processor to execute various types of processing in conjunction with hibernation. It is undesirable for the processor to consume a great amount of electric power in conjunction with hibernation.

An information processing device for solving the above problem includes a main processing circuit that is configured to realize various types of processing by executing a program, dynamic random-access memory (DRAM) that is volatile memory and that requires refresh processing to retain data, static random-access memory (SRAM) that is volatile memory and does not require refresh processing to retain data, and a sub-processing circuit that is configured to realize evacuation processing of reading particular data that is data stored in the DRAM and performing storage thereof in the SRAM. When an execution condition for hibernation that is set in advance is satisfied, the sub-processing circuit executes the evacuation processing. After the evacuation processing is completed, the main processing circuit cuts off electric power supply to the DRAM while maintaining electric power supply to the SRAM. At startup, when the particular data is stored in the SRAM, the main processing circuit reads the particular data stored in the SRAM.

According to the above-described configuration, the evacuation processing in which data in the DRAM is stored in the SRAM is executed by the sub-processing circuit, rather than by the main processing circuit that is capable of executing various types of processing. It is sufficient for this sub-processing circuit to be capable of executing the evacuation processing. Accordingly, a circuit with low electric power consumption can be employed for the sub-processing circuit, even though at a processing speed that is somewhat slower. Thus, according to the above configuration, the electric power consumed in conjunction with executing evacuation processing can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Vehicle

Hereinafter, an embodiment of the present disclosure will be described with reference to FIG. 1 to FIG. 4. First, a schematic configuration of the vehicle 100 will be described.

Figure 1:
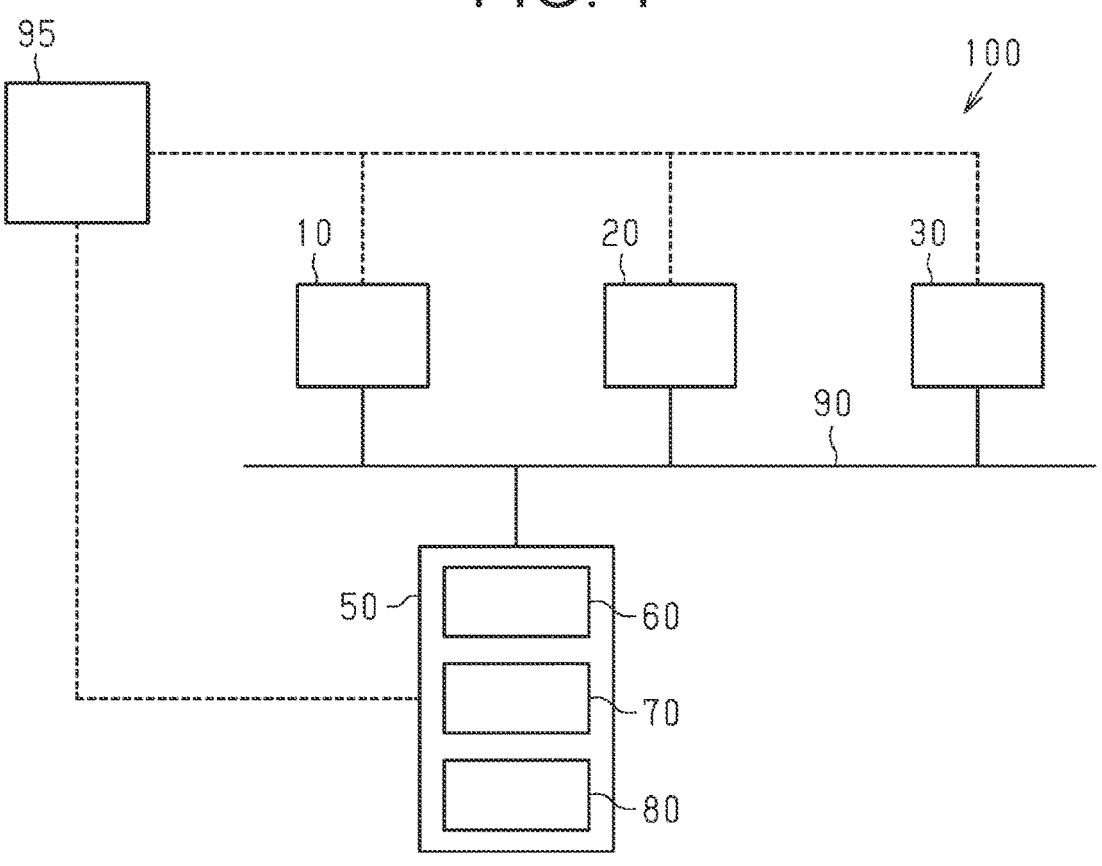
FIG. 1 is a schematic configuration diagram of a vehicle.

As illustrated in FIG. 1, the vehicle 100 includes an engine ECU 10, a braking ECU 20, an advanced driving support ECU 30, and a multimedia ECU 50. Note that "ECU" is an abbreviation for Electronic Control Unit. The vehicle 100 includes an external bus 90 and a battery 95. The external bus 90 communicatively connects the engine ECU 10, the brake ECU 20, the advanced driving support ECU 30, and the multimedia ECU 50 to each other. Battery 95 provides electric power to the engine ECU 10, braking ECU 20, advanced driving assistance ECU 30, and multimedia ECU 50.

The engine ECU 10 controls an engine (not shown). In the present embodiment, the engine is a driving source of the vehicle 100. The brake ECU 20 controls a brake device (not shown). The advanced driving support ECU 30 realizes driving support corresponding to application software by executing various application software. Note that the various applications include application software or the like for following the vehicle 100 while keeping the distance between the vehicle and the front vehicle traveling in front of the vehicle constant.

The multimedia ECU 50 controls a navigation device, an audio device, and the like (not shown). The multimedia ECU 50 includes a CPU 60, a main memory 70, and a storage 80. CPU 60, the main memory 70, and the storage 80 can communicate with each other via an internal bus (not shown) in the multimedia ECU 50. The storage 80 is a non-volatile memory. An example of the storage 80 is a so-called flash memory. The storage 80 stores various programs and various data in advance. Here, an example of the various programs is application software for operating a navigation device, an audio device, and the like. Further, an example of various types of data is data related to settings of a navigation device, an audio device, and the like. Specifically, the various types of data are data related to the volume set by the user of the vehicle 100 and the like. The storage

80 includes peripheral circuits such as a power supply circuit and a data converter. CPU 60 can implement various processing by executing a program stored in the storage 80 or the like. In the present embodiment, CPU 60 is an exemplary main processing circuit. Further, the multimedia ECU 50 is an exemplary information processing device.

Figure 2:
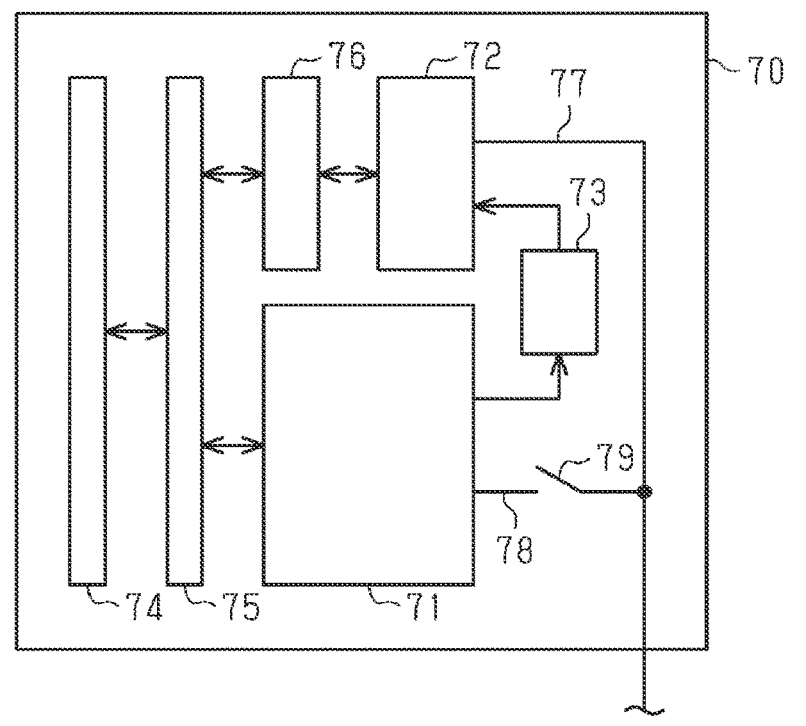
FIG. 2 is a schematic configuration diagram of a main memory.

As illustrated in FIG. 2, the main memory 70 includes a DRAM 71, SRAM 72, hibernation circuitry 73, and interfaces 74. The main memory 70 includes a decoder 75, a bridge 76, a first power line 77, a second power line 78, and a power switch 79.

DRAM 71 are volatile memory. In addition, DRAM 71 needs a refresh processing for retaining data. The refresh processing is a processing of reading out data of each element and storing the data again. In this specification, storing is writing data. DRAM 71 is connected to the interfaces 74 via decoders 75. The interface 74 is connected to CPU 60 via an internal bus (not shown) in the multimedia ECU 50. That is, the interfaces 74 communicatively connect CPU 60 and DRAM 71. The decoder 75 converts the code input to the decoder 75 into a signal that can be recognized by DRAM 71, or converts the code input to the decoder 75 into a signal that can be recognized by CPU 60.

SRAM 72 are volatile memory. In addition, SRAM 72 does not need a refresh processing for retaining data. Therefore, the electric power consumed by SRAM 72 for retaining data is smaller than the electric power consumed by DRAM 71 for retaining data. In the present embodiment, the storage capacity of SRAM 72 is smaller than the storage capacity of DRAM 71. SRAM 72 is connected to the decoders 75 via bridges 76. That is, the bridges 76 are interposed between the interfaces 74 and SRAM 72. The bridge 76 converts a signal input to the bridge 76 into a signal recognizable by a SRAM 72, or a signal input to the bridge 76 into a signal recognizable by the decoder 75. In this embodiment, the bridges 76 are transducers that are interposed between interfaces 74 and SRAM 72 and that communicatively convert data between CPU 60 and SRAM 72.

The hibernation circuitry 73 is interposed between DRAM 71 and SRAM 72. The hibernation circuitry 73 can implement evacuation processing of reading out a particular data DA that is data stored in DRAM 71 and storing it in SRAM 72. Specifically, in the evacuation processing, the hibernation circuitry 73 stores data stored in a predetermined particular region as part of the storage area of DRAM 71 in SRAM 72 as particular data DA. Note that the storage capacity of the particular region of DRAM 71 is equal to or less than the storage capacity of SRAM 72. In the present embodiment, the hibernation circuitry 73 is a dedicated circuit for performing an evacuation processing. The processing speed of the hibernation circuitry 73 is lower than the processing speed of CPU 60. Therefore, the electric power consumed when the hibernation circuitry 73 performs the evacuation processing is smaller than the electric power consumed when CPU 60 performs the evacuation processing. The hibernation circuitry 73 is an example of a sub-processing circuit.

The hibernation circuitry 73 may be configured as a circuit (circuitry) including one or more processors that execute various types of processing in accordance with a computer program (software). The hibernation circuitry 73 may be configured as a circuit including one or more dedicated hardware circuits, such as an application-specific integrated circuit (ASIC), or a combination thereof, that performs at least some of the various types of processing. The processor includes a CPU and a memory such as a random access memory (RAM) and a ROM. The memory stores a program code or an instruction configured to execute the CPU to perform processing. Memory or computer-readable media includes any medium that can be accessed by a general purpose or special purpose computer.

A first end of the first power line 77 is connected to SRAM 72. The second end of the first power line 77 is connected to the battery 95. Therefore, the first power line 77 is capable of supplying electric power from the battery 95 to SRAM 72.

A first end of the second power line 78 is connected to DRAM 71. The second end of the second power line 78 is connected to the middle of the first power line 77. Thus, the second power line 78 can provide electric power from the battery 95 to DRAM 71. The power switch 79 is located in the middle of the second power line 78. When the power switch 79 is on, the power switch 79 allows electric power to be supplied from the battery 95 to DRAM 71. On the other hand, when the power switch 79 is in the off-state, the power switch 79 shuts off electric power from the battery 95 to DRAM 71.

Evacuation Control

Next, referring to FIG. 3, the evacuation control executed by the multimedia ECU 50 will be described. The evacuation control is a control for storing the particular data DA stored in DRAM 71 in SRAM 72. In the present embodiment, the multimedia ECU 50 starts the evacuation control at every predetermined control cycle on condition that the system of the vehicle 100 is in the on-state. The on-state of the system of the vehicle 100 is a state in which electric power is supplied from the battery 95 to all ECU of the engine ECU 10, the brake ECU 20, the advanced driving support ECU 30, and the multimedia ECU 50. Therefore, the on-state includes a state referred to as a sleep state, a standby state, or the like in which the respective ECU can realize only some functions.

Figure 3:
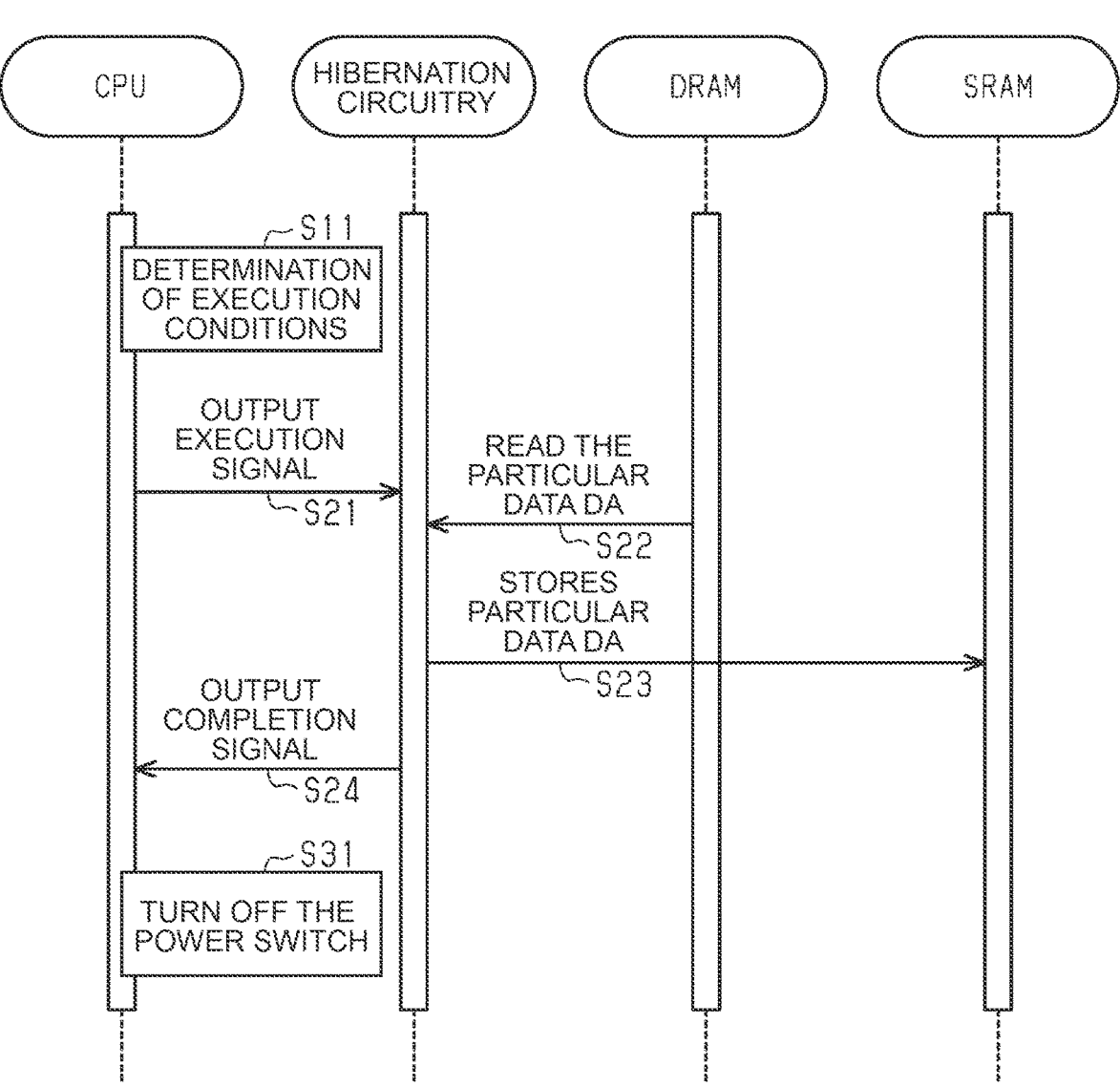
FIG. 3 is a sequential diagram showing the evacuation control.

As illustrated in FIG. 3, when the evacuation control is started, CPU 60 of the multimedia ECU 50 executes S11 processing. In S11, CPU 60 determines whether a predetermined execution condition for hibernation is satisfied. In the present embodiment, an example of the execution condition is that a request to switch the system of the vehicle 100 to the off state is generated when a start switch (not shown) is operated by the user of the vehicle 100. The start switch may be referred to as an ignition switch, a system-on switch, or the like. In S11, when CPU 60 determines that the execution-condition is not satisfied (S11: NO), CPU 60 ends the current evacuation control. On the other hand, when CPU 60 determines in S11 that the execution-condition is satisfied (S11: YES), CPU 60 advances the processing to S21.

In S21, CPU 60 outputs to the hibernation circuitry 73 an execution signal for executing the evacuation processing. As a result, the hibernation circuitry 73 acquires the execution signal. After S21, the hibernation circuitry 73 advances the processing to S22.

In S22, the hibernation circuitry 73 reads out the particular data DA stored in DRAM 71. In the present embodiment, an exemplary particular data DA is data generated when a CPU 60 executes software. Specifically, the particular data DA includes a random number table generated by CPU 60, clock settings calibrated when various types of communication are started, data indicating which steps the application software is executed, and the like. After S22, the hibernation circuitry 73 advances the processing to S23.

In S23, the hibernation circuitry 73 stores the particular data DA read by S22 in SRAM 72. In the present embodiment, the processes of S22 and S23 correspond to the evacuation processing. After S23, the hibernation circuitry 73 advances the processing to S24.

In S24, the hibernation circuitry 73 outputs a completion signal indicating that the evacuation processing has been completed to CPU 60. Consequently, CPU 60 obtains a completion signal. After S24, CPU 60 advances the processing to S31. In other words, CPU 60 advances the processing to S31 after the evacuation processing is completed.

In S31, CPU 60 turns off the power switch 79 by outputting a control signal to the power switch 79. Consequently, electric power is cut off from the battery 95 to DRAM 71. In other words, CPU 60 shuts off the electric power supply to DRAM 71 while maintaining the electric power supply to SRAM 72. Note that, when the electric power supplied to DRAM 71 is interrupted, all data including the particular data DA stored in DRAM 71 is erased. After S31, CPU 60 ends the current evacuation control.

Startup Control

Figure 4:
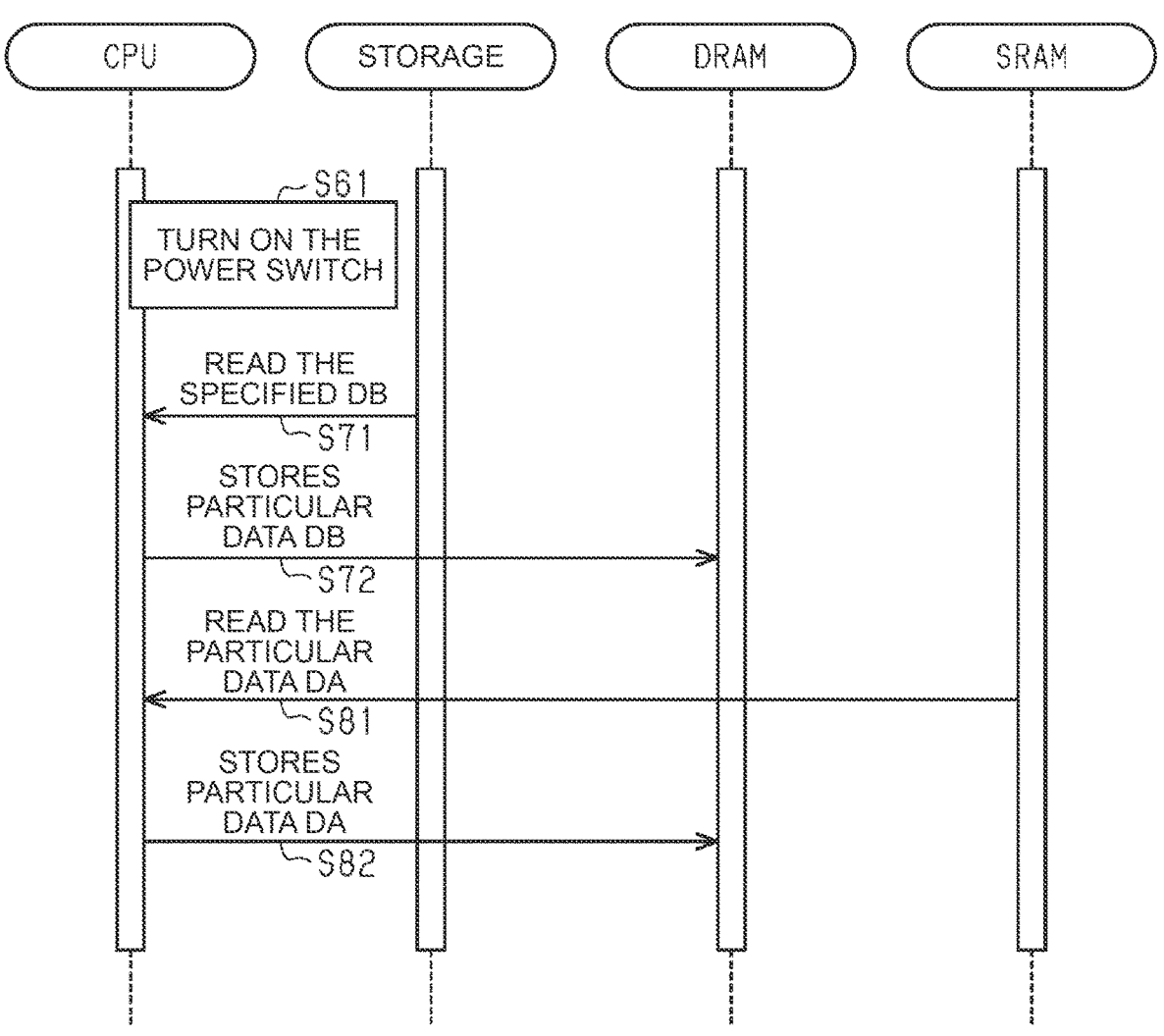
FIG. 4 is a sequence diagram illustrating startup control.

Referring now to FIG. 4, startup time control performed by the multimedia ECU 50 will be described. The startup control is a control for reading out the particular data DA and the like stored in SRAM 72. In the present embodiment, the multimedia ECU 50 starts the startup control when a start switch (not shown) is operated by the user of the vehicle 100 to switch the system of the vehicle 100 to the on-state. In other words, when the multimedia ECU 50 is startup, in particular, when all the functions of the multimedia ECU 50 including DRAM 71 are startup, the multimedia ECU 50 starts the startup time control.

As illustrated in FIG. 4, CPU 60 of the multimedia ECU 50 executes S61 processing when the startup control is started. In S61, CPU 60 turns on the power switch 79 by outputting a control signal to the power switch 79. Consequently, electric power is supplied to DRAM 71 from the battery 95. In other words, CPU 60 resumes electric power supply to DRAM 71 while maintaining electric power supply to SRAM 72. Thus, after S61, DRAM 71 can store the data. After S61, CPU 60 advances the processing to S71. In other words, CPU 60 proceeds processing to S71 after resuming electric power supply to DRAM 71.

In S71, CPU 60 reads out the particular data DB which is data stored in the storage 80. Here, an exemplary defined data DB is data related to settings of application software and peripheral devices. The peripheral device is, for example, a navigation device, an audio device, or the like. After S71, CPU 60 advances the processing to S72.

In S72, CPU 60 stores the specified DB read by S71 in DRAM 71. After S72, CPU 60 advances the processing to S81.

In S81, CPU 60 reads the particular data DA stored in SRAM 72. When the particular data DA is not stored in SRAM 72 by the evacuation control, CPU 60 ends the current startup control without executing S81 processing and S82 processing described later. After S81, CPU 60 advances the processing to S82.

In S82, CPU 60 stores the particular data DA read by S81 in DRAM 71. That is, DRAM 71 is restored to the particular data DA stored in DRAM 71 immediately before the above-described evacuation processing. After S82, CPU 60 terminates the current startup control. After the startup control, CPU 60 can execute various processing by referring to the particular data DA restored to DRAM 71 with DRAM 71 as a working region as needed.

Operations of Present Embodiment

As illustrated in FIG. 3, when the execution condition of S11 in the evacuation control is satisfied, in S21, CPU 60 outputs an execution signal for executing the evacuation processing to the hibernation circuitry 73. Then, in S22 and S23, the hibernation circuitry 73 executes an evacuation processing of reading out the particular data DA stored in DRAM 71 and storing it in SRAM 72. Then, after the evacuation processing is completed, in S31, CPU 60 cuts off the electric power supply to DRAM 71 while maintaining the electric power supply to SRAM 72.

Effects of Present Embodiment (1) According to the present embodiment, the hibernation circuitry 73 executes the evacuation processing instead of CPU 60 capable of executing the various processing. The hibernation circuitry 73 only needs to be able to execute the evacuation processing. Therefore, as the hibernation circuitry 73, a circuit which consumes less electric power than CPU 60 can be adopted even if the processing rate is slower than that of CPU 60. Therefore, in the multimedia ECU 50, it is possible to suppress the electric power consumed by executing the evacuation processing.

(2) In S23, the hibernation circuitry 73 stores the particular data DA read by S22 in SRAM 72. Here, generally, the read/write speed for SRAM 72 is higher than the read/write speed for the storage 80 which is a non-volatile memory. Therefore, according to the present embodiment, it is possible to shorten the time required to store the particular data DA as compared with, for example, when the particular data DA read by S22 is stored in the storage 80.

(3) Generally, the structure of SRAM 72 is more complex than the structure of DRAM 71. Therefore, when compared with the same storage capacity, the cost of SRAM 72 is larger than the cost of DRAM 71. In this regard, in the evacuation processing, the hibernation circuitry 73 stores data stored in a predetermined particular region as part of the storage area of DRAM 71 in SRAM 72 as the particular data DA. As a result, for example, compared to cases where the particular data DA is data stored in all the storage region of DRAM 71, the storage space required by SRAM 72 can be suppressed. That is, the storage capacity of the relatively expensive SRAM 72 can be suppressed.

(4) In the present embodiment, the interfaces 74 communicatively connect CPU 60 and DRAM 71. The bridges 76 are also converters that are interposed between the interfaces 74 and SRAM 72 and communicatively convert data between CPU 60 and SRAM 72. According to this configuration, since DRAM 71 and SRAM 72 interfaces 74 are shared, CPU 60 can communicate with DRAM 71 and SRAM 72 by accessing the same interface 74. In other words, CPU 60 can treat DRAM 71 and SRAM 72 as the same type of storage region. Further, since the interfaces 74 of DRAM 71 and SRAM 72 are standardized, it is possible to expect compactness of the interface 74 and cost-reduction of the interface 74 as compared with, for example, a case where two interfaces are provided.

(5) As illustrated in FIG. 4, in S71 and S72 in the startup control, CPU 60 stores the particular data DB, which is the data stored in the storage 80, in DRAM 71. After electric power to DRAM 71 is restarted, in S81 and S82, CPU 60 stores the particular data DA, which is stored in SRAM 72, in DRAM 71. As a result, various types of data including the particular data DA can be aggregated in a DRAM 71 where the storage capacity is generally larger than that of SRAM 72. If various data can be aggregated as described above, CPU 60 processing can be expected to be speeded up as compared with, for example, when various data are distributed in DRAM 71 and SRAM 72.

(6) In the present embodiment, the particular data DA is data generated when CPU 60 executes the software. Specifically, the particular data DA includes a random number table generated by CPU 60, clock settings calibrated when various types of communication are started, and data indicating up to which steps the application software is executed. According to this configuration, when the multimedia ECU 50 is startup, CPU 60 can read the particular data DA including the data generated when CPU 60 executes the software from SRAM 72. As a result, CPU 60 can quickly grasp the data generated when CPU 60 executes the software, as compared with, for example, reading the particular data DA from the storage 80. If CPU 60 can quickly grasp the data generated when executing the software, the execution of the application software can be quickly resumed after the multimedia ECU 50 is startup.

Modifications

The present embodiment can be realized with the following modifications. The present embodiment and the following modifications can be combined with each other within a technically consistent range to be realized.

In the above-described embodiment, the evacuation control may be changed.

For example, the execution condition of S11 may be changed. As a specific example, in S11, CPU 60 may determine that the execution condition is satisfied every time a predetermined period of time, such as when the environment outside the vehicle 100 is assumed to have changed, elapses. An example of the prescribed period is several tens of days to several months. In addition, in S11, CPU 60 may determine that the predetermined data has been updated to satisfy the condition. An example of the predetermined data is data related to an initial setting of the vehicle 100 that is updated as a user using the vehicle 100 changes. Further, as a specific example, in S11, CPU 60 may determine that the execution-condition is satisfied when the remaining amount of the battery 95 is equal to or less than a predetermined remaining amount. When it is determined that the execution condition is satisfied when the request to switch the system of the vehicle 100 to the off-state does not occur as described above, S31 processing may be omitted.

For example, the data size of the particular data DA of S22 may be changed. As a specific example, if the data size of the particular data DA is equal to or smaller than the storage capacity of SRAM 72, the particular data DA may be data stored in all the storage region of DRAM 71.

For example, the data included in the particular data DA of S22 may be changed. That is, the particular data DA may include other data in addition to or in place of the random number table, clock settings, and data indicating which steps the application software has been executed. As the particular data DA, it is preferable to adopt data that is smaller in data size as in the random number table, but takes a long time to generate, or does not need to change the setting every time the clock is startup, as in the clock setting.

In the above-described embodiment, the startup time control may be changed.

For example, S82 processing may be omitted. In other words, the particular data DA stored in SRAM 72 and the particular data DB that is the data stored in the storage 80 may not be aggregated in DRAM 71.

In the above-described embodiment, the configuration of the vehicle 100 may be changed.

For example, the information processing device may be another ECU. In addition to the multimedia ECU 50, the information processing device may include ECU such as an engine ECU 10, a braking ECU 20, and an advanced driving support ECU 30. Alternatively, instead of the multimedia ECU 50, an ECU such as an engine ECU 10, a braking ECU 20, and an advanced driving support ECU 30 may be the information processing device.

For example, the main memory 70 may include an interface for DRAM 71 and an interface for SRAM 72 in place of the interface 74. DRAM 71 may be connected to DRAM 71 interfaces via decoders for DRAM 71. SRAM 72 may be connected to SRAM 72 interfaces via decoders for SRAM 72. In this configuration, the bridge 76, that is, the converter can be omitted.

What is claimed is:

1. An information processing device, comprising:
   a main processing circuit that is configured to realize various types of processing by executing a program;
   dynamic random-access memory (DRAM) that is volatile memory and that requires refresh processing to retain data;
   static random-access memory (SRAM) that is volatile memory and that does not require refresh processing to retain data; and
   a sub-processing circuit of which a processing speed is slower than that of the main processing circuit, the sub-processing circuit being connected between the DRAM and the SRAM, wherein
   the main processing circuit is configured to
      determine whether an execution condition to execute an evacuation process is satisfied, the evacuation process including reading particular data that is data stored in the DRAM and storing the particular data read from the DRAM in the SRAM, and
      transmit an execution signal to the sub-processing circuit in response to a determination that the execution condition is satisfied,
   the sub-processing circuit is configured to
      execute the evacuation process in response to the execution signal transmitted from the main processing circuit, and
      transmit a completion signal to the main processing circuit in response to completion of the evacuation process, and
   the main processing circuit is further configured to
      cut off electric power supply to the DRAM while maintaining electric power supply to the SRAM, in response to receiving the completion signal from the sub-processing circuit,
      restart the electric power supply to the DRAM while maintaining electric power supply to the SRAM, and read the particular data stored in the SRAM and store the particular data read from the SRAM in the DRAM, in a case where the particular data is stored in the SRAM at a timing of restarting the electric power supply to the DRAM.

2. The information processing device according to claim 1, further comprising:

an interface for communicatively connecting the main processing circuit and the DRAM; and a converter that is interposed between the interface and the SRAM, and that communicatively converts data between the main processing circuit and the SRAM.

3. The information processing device according to claim 1, wherein the particular data includes data generated when the main processing circuit executes software.

4. The information processing device according to claim 1, wherein the information processing device is a multimedia electronic control unit (ECU) mounted in a vehicle, the multimedia ECU being configured to control a navigation device and an audio device of the vehicle.

5. The information processing device according to claim 1, wherein the sub-processing circuit is a dedicated circuit for executing the evacuation process.

6. The information processing device according to claim 1, wherein the execution condition is that a request to switch a system of a vehicle to an off-state is generated.

7. The information processing device according to claim 1, wherein the execution condition is that a predetermined period of time has elapsed from a previous execution of the evacuation process.

8. The information processing device according to claim 1, wherein the execution condition is that a remaining amount of a battery is equal to or less than a predetermined remaining amount.

* * * * *